(12) United States Patent
Dubay et al.

(10) Patent No.: US 7,140,693 B2
(45) Date of Patent: Nov. 28, 2006

(54) MILLING MACHINE WITH RE-ENTERING BACK WHEELS

(75) Inventors: Gregory Henry Dubay, Bologna (IT); Michele Orefice, Molinella (IT); Dario Sansone, Catello d'Argile (IT)

(73) Assignee: Bitelli SpA (IT)

( * ) Notice: Subject to any disclaimer, the term of this patent is extended or adjusted under 35 U.S.C. 154(b) by 0 days.

(21) Appl. No.: 10/476,206

(22) PCT Filed: Apr. 26, 2002

(86) PCT No.: PCT/EP02/04638

§ 371 (c)(1),
(2), (4) Date: Oct. 27, 2003

(87) PCT Pub. No.: WO02/103117

PCT Pub. Date: Dec. 27, 2002

(65) Prior Publication Data

US 2004/0135421 A1  Jul. 15, 2004

(30) Foreign Application Priority Data

Apr. 27, 2001  (IT) .......................... VI2001A0092

(51) Int. Cl.
*E01C 23/088* (2006.01)
(52) U.S. Cl. .................. 299/39.1; 404/94; 180/209
(58) Field of Classification Search .............. 180/209; 280/6.155, 43.17; 299/36.1, 37.1, 39.3–39.5, 299/39.1; 404/84.05, 90, 93, 94
See application file for complete search history.

(56) References Cited

U.S. PATENT DOCUMENTS

| 2,090,235 | A |  | 8/1937 | Schauer |
| 3,188,026 | A |  | 6/1965 | Perdue et al. |
| 3,236,324 | A |  | 2/1966 | Levratto |
| 3,306,390 | A |  | 2/1967 | Jamme |
| 3,572,458 | A |  | 3/1971 | Tax |
| 3,664,448 | A |  | 5/1972 | Hudis |
| 3,792,745 | A |  | 2/1974 | Files |
| 3,838,885 | A |  | 10/1974 | Brennan |
| 3,843,274 | A | * | 10/1974 | Gutman et al. ............... 404/91 |
| 3,971,594 | A |  | 7/1976 | Wirtgen |
| 4,029,165 | A |  | 6/1977 | Miller et al. |

(Continued)

FOREIGN PATENT DOCUMENTS

DE        485 299        10/1929

(Continued)

OTHER PUBLICATIONS

Nullity Action Dated; Feb. 1, 2001.

(Continued)

*Primary Examiner*—Sunil Singh
(74) *Attorney, Agent, or Firm*—John J. Cheek; Stephen L. Noe

(57) ABSTRACT

A work machine includes a frame (2) supported by a plurality of wheels or tracks (5), at least some of which are associated with respective lifting columns (32) adapted to raise and lower the frame (2) relative to the respective wheels or track (5). A work tool is supported by the frame (2), and a drive mechanism is adapted to rotate the work tool and at least one of or tracks (5). An articulation apparatus (10) uses a first actuator (20) and a pivoting support arm (11) to move one of the wheels or tracks (5) between a projecting position and a retracted position relative to the frame (2). The articulation apparatus (10) includes a second actuator (21) adaped to rotate the wheel or track (5) about a vertical axis (Z).

38 Claims, 5 Drawing Sheets

U.S. PATENT DOCUMENTS

| | | | |
|---|---|---|---|
| 4,120,507 A | 10/1978 | Miller | |
| 4,200,162 A | 4/1980 | Tax | |
| 4,270,801 A | 6/1981 | Swisher et al. | |
| 4,387,814 A | 6/1983 | Beduhn et al. | |
| 4,619,340 A | 10/1986 | Elmer et al. | |
| 5,190,398 A | 3/1993 | Swisher | |
| 6,106,073 A * | 8/2000 | Simons et al. | 299/39.6 |
| 6,173,512 B1 | 1/2001 | Bitelli | |
| 6,286,615 B1 | 9/2001 | Bitelli | |
| 6,435,766 B1 * | 8/2002 | Titford | 404/75 |
| 6,443,687 B1 * | 9/2002 | Kaiser | 414/685 |
| 6,705,798 B1 | 3/2004 | Dubay et al. | |

FOREIGN PATENT DOCUMENTS

| | | |
|---|---|---|
| DE | 542 839 | 1/1932 |
| DE | 547 781 | 3/1932 |
| DE | 595 113 | 3/1934 |
| DE | 616 503 | 7/1935 |
| DE | 646 378 | 5/1937 |
| DE | 649 305 | 8/1937 |
| DE | 668 783 | 11/1938 |
| DE | 690 278 | 3/1940 |
| DE | 734 710 | 3/1943 |
| DE | 1 430 694 | 11/1968 |
| DE | 2 405 292 | 8/1974 |
| DE | 25 41 895 | 3/1977 |
| DE | 27 35 385 | 2/1979 |
| DE | 196 31 042 | 2/1998 |
| EP | 0 291 844 B1 | 11/1988 |
| FR | 730 154 | 8/1932 |
| JP | 01-137903 | 5/1989 |
| JP | 07-089696 | 4/1995 |
| WO | WO 97/42377 | 11/1997 |

OTHER PUBLICATIONS

Brief Dated; May 17, 2001.

Brief Dated; Apr. 25, 2002.

* cited by examiner

MILLING MACHINE WITH RE-ENTERING BACK WHEELS

TECHNICAL FIELD

The present invention relates generally to work machines for the treatment of roadway surfaces, and more particularly to a planer or milling machine for asphalt and concrete.

BACKGROUND

A prospectus entitled "Bitelli Volpe SF 100 T4M deep-cut cold planer for asphalt and concrete" describes a work machine comprising a frame which is supported by four wheels, a pair of oppositely arranged front wheels and a pair of oppositely arranged rear wheels. One of the rear wheels is adapted to raise and lower the frame relative to the respective rear wheel. Means are provided to allow for two operating positions of the one rear wheel. In a first operating position the rear wheel is mounted at the frame in what is called a projecting position, in a second operating position the rear wheel is mounted at the frame in a retracted position relative to the general outline of the frame. To allow for movement between the two operating positions a support arm is provided, which is, at its one end, pivotally connected to the frame and carries at its other end a wheel support comprising a lifting column. Typically, the rear wheel is driven by a hydraulic motor located in the hub of the rear wheel. Pressurized fluid is supplied to the hydraulic motor (and also any other hydraulic motors of other wheels which need to be driven) from an internal combustion engine mounted to the frame. To move the rear wheel from its projecting position into its retracted position the operator hydraulically lowers the frame with respect to the rear wheel. i.e. a hydraulic cylinder located inside the lifting column provides for this lowering movement. As soon as the frame or some other component fixedly mounted to the frame comes into engagement with the ground, the lifting column is lifted further by means of the hydraulic cylinder, so that the lower surface of the wheel is eventually spaced a certain distance from ground. Preferably, before the lifting of the wheel from ground has occurred, a pin locking the support arm at the frame is removed. After the wheel is spaced from the ground the operator pivots the support arm, and also simultaneously rotates the lifting column so that the running direction of the rear wheel is maintained for the two operating positions.

The possibility of positioning at least one of the rear wheels in the projecting position improves weight distribution during operation of the work machine, while the possibility of positioning the wheel in the retracted position allows the work machine to operate flush to a wall or curb. However, the manual operation of displacing and locking or unlocking the pivotable wheel is somewhat uncomfortable for the operator, who is obliged to leave his seat and carry out the required operations manually.

EP 0 916 004 A1 discloses a work machine for the treatment of roadways having a rear support wheel which can be pivoted between an interior or retracted position and an exterior or projecting position by means of a guide rod gear consisting of a four-link mechanism with four vertical articulated axles and two guide rods pivotable in a horizontal plane connected to the rear support wheel. The guide rod gear pivots the rear wheel supported by a non-rotatingly locked lifting column from the exterior position to the retracted position such that the rear wheel turns in the retracted position and in the exterior position in the same direction. With this design the respective load of the work machine resting on the rear wheel is distributed to all four links of the four-link mechanism, which may result in a reduced stability and stiffness of the work machine. Also, precise couplings have to be provided which need to be inspected frequently so as to keep the wear, which might compromise good operation of the work machine, under control.

Further, typical cold planers may be fitted with tracks instead of wheels which is of advantage especially for very heavy machines. As with wheels, it is desirable to be able to change the relative position of at least one of the tracks relative to the frame, i.e. in a retracted or projecting position relative to the frame. However, this also changes the steering characteristic for the whole machine which is more accentuated when the machine is fitted with tracks instead of wheels.

The present invention is directed to overcoming one or more of the problems or disadvantages associated with the prior art.

SUMMARY OF THE INVENTION

In accordance with one embodiment of the present invention there is provided a work machine, in which the automated movement to position a wheel or track assembly either projecting or retracted relative to the frame occurs with a greater stability in comparison with known machines, and which is less prone to wear, requires less maintenance, and is easier to manufacture than known machines. At the same time, change of rotational direction of the wheel or track about a vertical axis is facilitated in a compact and robust manner to adapt for the changing steering requirements when moving the wheel or track from the projecting to the retracted position relative to the frame and vice versa.

This is accomplished by a work machine that, according to the main claim, includes a frame supported by a plurality of wheels or tracks, at least some of which are associated with respective lifting columns adapted to raise and lower the frame relative to the respective wheels or tracks. Preferably, each of the wheels or tracks is associated with one respective lifting column. A work tool is supported by the frame, and a drive mechanism is adapted to rotate the work tool and at least one of the wheels or tracks. An articulation apparatus uses a first actuator and a pivoting support arm to move one of the wheels or tracks between a projecting position and a retracted position relative to the frame. The articulation apparatus further includes a second actuator adapted to rotate the wheel or track about a vertical axis (Z).

A method for controlling the position of one of the wheels or tracks of a work machine is also provided, including pivoting the wheel or track between a projecting and retracted position and positioning the wheel or track in a selected rotational direction about a vertical axis (Z).

BEST MODE FOR CARRYING OUT THE INVENTION

Figure 1:
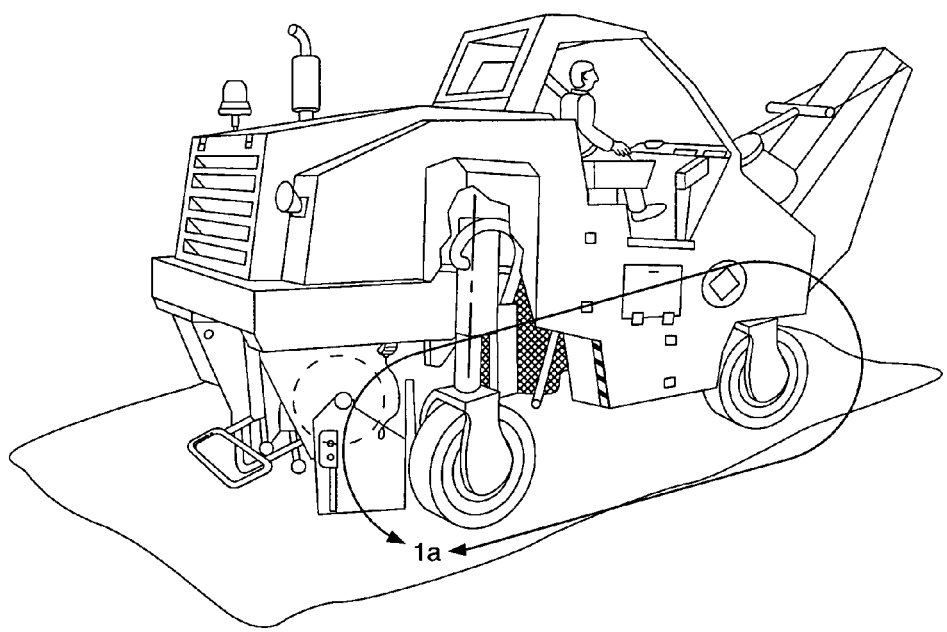
FIG. 1 is an isometric view of a work machine, i.e. a cold planer, in which the features of the present invention may be incorporated.
Figure 1A:
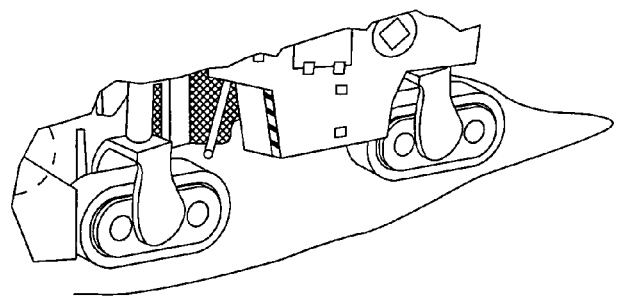

The work machine 1 of FIG. 1 comprises a frame 2 supported by a pair of front wheels 4, a pair of rear wheels 5, and an operator seat 3 for an operator O. A work tool 6, e.g. a cutter or milling drum for removing road surface material like asphalt or concrete is supported and rotatably connected to the frame 2 by means of a rotary shaft 8 and arranged in a work space generally indicated by numeral 7. A drive mechanism (not shown), for instance an internal combustion engine, is mounted inside of the work machine 1 on the frame 2 in a position generally indicated by the reference numeral 9 behind the operator seat 3. The drive mechanism supplies the power for rotating the work tool 6 and also the front wheels 4 and/or the rear wheels 5 resting on the surface of the road paving to be worked on generally indicated as plane $\pi$.

One of the two rear wheels 5 is adapted to be moved between a projecting position (shown) and a retracted position, and vice versa. Conceivably, more than one wheel 4, 5 could be designed to be movable between the two positions.

Although in FIG. 1 the work machine 1 is illustrated as being supported by wheels 4, 5, the term "wheel" is used throughout the specification to indicate either a wheel or a track assembly.

Referring now to FIGS. 2 to 5, the work machine 1 includes an articulation apparatus 10 (FIGS. 2 and 5) adapted to pivotally move one of the rear wheels 5 between a projecting position 60 (in FIG. 2) and a retracted position 70 (see FIG. 3) relative to the frame 2. The articulation apparatus 10 is arranged between the frame 2 and a rear wheel support of the rear wheel 5 as will be described in detail below.

Figure 4:
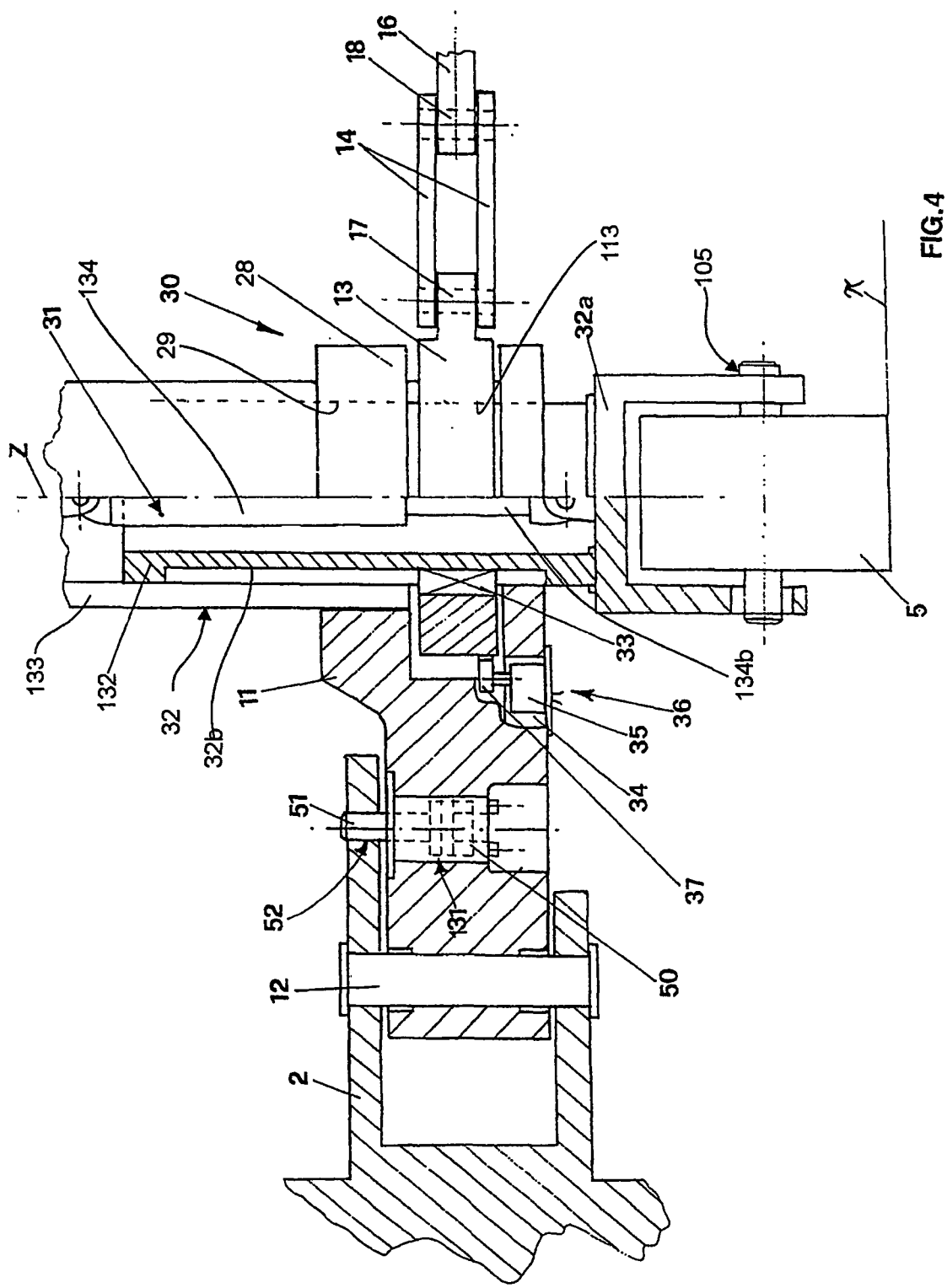
FIG. 4 is a schematic vertical sectional view of the detail of FIG. 2.

As is shown in FIG. 4 the rear wheel 5 is supported by the rear wheel support comprising a U-shaped bracket 32a and, fixedly mounted thereto, a vertical lifting column generally indicated at 32. The lifting column 32 includes a sleeve or inside column 132 slideably mounted inside a support column (also called outside column) 133. The sleeve 132 may be vertically moved relative to the support column 133 by means of a lifting column acutator 31. The wheel 5 is rotatably mounted by a bearing 105 on the bracket 32a which is attached to the sleeve 132 such as by welding so as to vertically move together with the sleeve 132. The bracket 32a also rotates with the sleeve 132 about a vertical axis Z so as to postion the wheel 5 in a selected rotational direction $\beta$ about the vertical axis Z.

Figure 2:
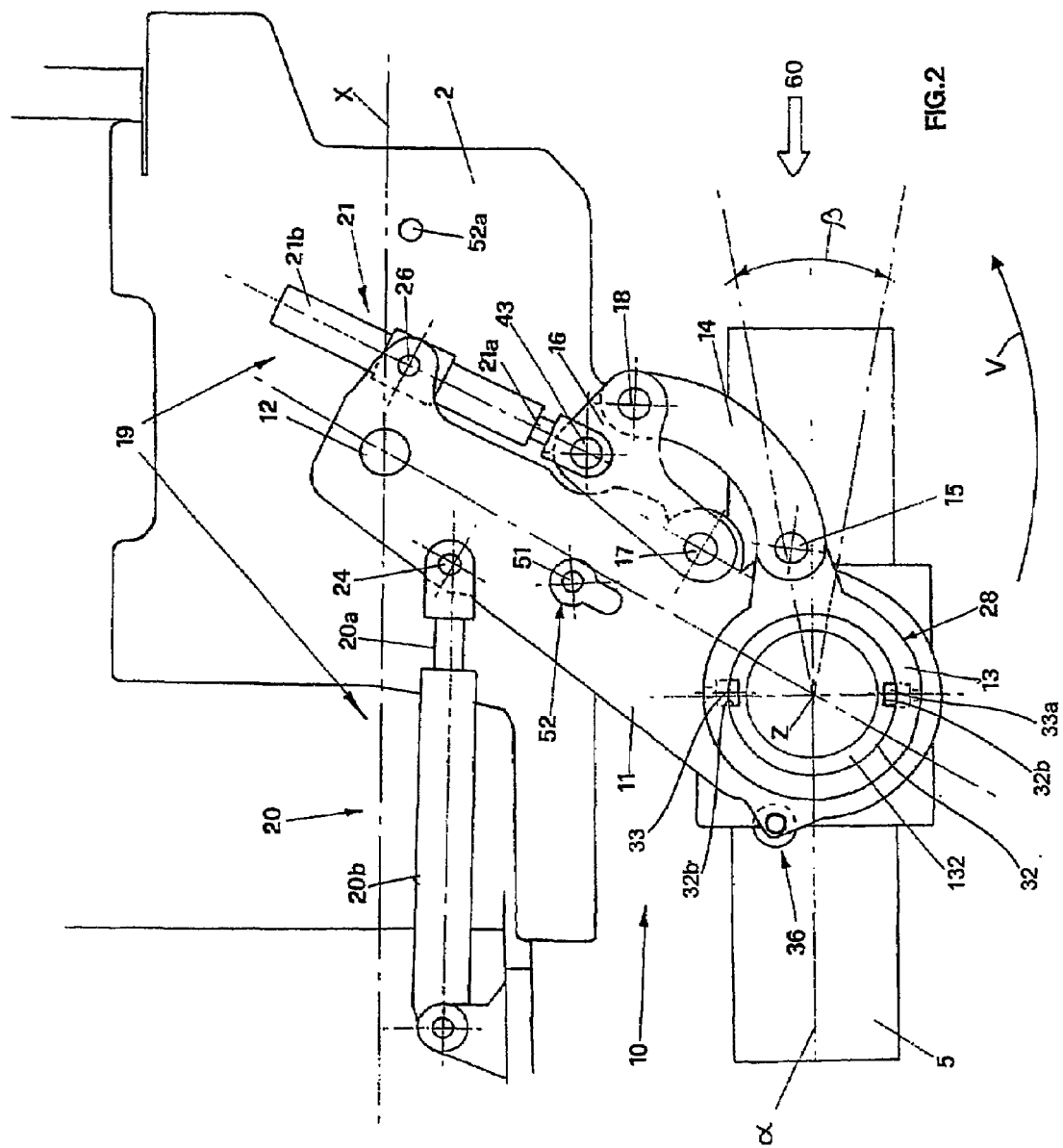
FIG. 2 is a schematic top plan view—partially in section—of a detail of a cold planer similar to the one of FIG. 1 showing an articulation apparatus of a preferred embodiment of the present invention with a rear wheel arranged in a projecting position relative to the frame.

Referring to FIG. 2, the articulation apparatus 10 extends between the frame 2 and the lifting column 32 of the rear wheel support. The articulation apparatus 10 comprises a support arm 11 connected to the lifting column 32 and pivotally mounted on the frame 2 and actuating means 19 for positioning the wheel 5. The actuating means 19 comprise a first actuator 20 for pivoting the support arm 11 relative to the frame 2 and a second actuator 21 for rotating the wheel 5 about the vertical axis Z which is generally orthogonal to the plane $\pi$ on which the wheel 5 rests.

The support arm 11 is connected to the lifting column 32 in such a manner that the sleeve 132 of the lifting column 32 can rotate about the vertical axis Z with respect to the support arm 11 and is allowed to move in a vertical direction along the vertical axis Z.

In particular, the lifting column 32 is arranged in a first seat 28 comprising a through hole 29 made in a fork shaped portion or end 30 of the support arm 11 as shown in FIG. 4. As also can be seen in FIG. 4, a coupling member 13 which is preferably formed as a ring is received over the sleeve 132 of the lifting column 32. The ring 13 is arranged coaxially with the vertical axis Z of the lifting column 32 or the wheel 5 in an axially and radially extending space defined by an upper and a lower wall of the fork shaped end 30 of the support arm 11.

The ring 13 is provided with a through hole 113. The through hole 29 in the fork shaped end 30 of the support arm and the through hole 113 are mutually coaxial. The through hole 29 receives the outside or support column 133 that ends at the upper wall of the seat 28.

As shown in FIG. 4, the outside column 133 is formed as a sleeve which is coaxially fixed, for instance by means of welding within the through hole 29, i.e. in the upper wall of the seat 28 or the fork shaped portion 30. Inside the support column 133, the sleeve or inside column 132 is coaxially arranged to the support column 133 and passes through the through hole 113 of the ring 13 and the through hole 29 in the lower wall of the seat 28. The through hole 29 receives the sleeve 132 rotatably and vertically movable relative to the support arm 11.

In particular, the ring 13 is coupled to the lifting column 32 by means of a longitudinally extending groove 32b provided in the sleeve 132. The groove 32b has a certain length defining the desirable extent of movement between the sleeve 132 and the support column 133. A key 33 is fixedly mounted on the ring 13 and engages the groove 32b so as to rotationally couple the ring 13 with the sleeve 132 but allowing sliding movement of the sleeve 132 relative to the support column 133 and the ring 13 in the vertical direction. In the preferred embodiment, a second key 33a mounted on the ring 13 engages another groove 32b provided in the sleeve 132 (see FIGS. 2 and 3).

The lifting column actuator 31 is arranged inside of the sleeve 132. Preferably, the lifting colum actuator 31 is a hydraulic jack having a body 134 connected to the support column 133, while the end of a stem 134b of the hydraulic jack is connected to the bracket 32a supporting the wheel 5. The hydraulic jack of the lifting column actuator 31 allows lifting and lowering, respectively, the wheel 5 in the vertical direction Z. Thus, the height of the support arm 11 relative to the ground or pavement to be worked on can be adjusted.

The second actuator 21 is connected between the support arm 11 and the lifting column 32 to cause relative rotation between the lifting column 32 and the support arm 11. The second actuator 21 is connected to the lifting column 32 via the coupling member 13 which, as mentioned above, is rotatably fixed to the sleeve 132 of the lifting column 32.

Figure 5:
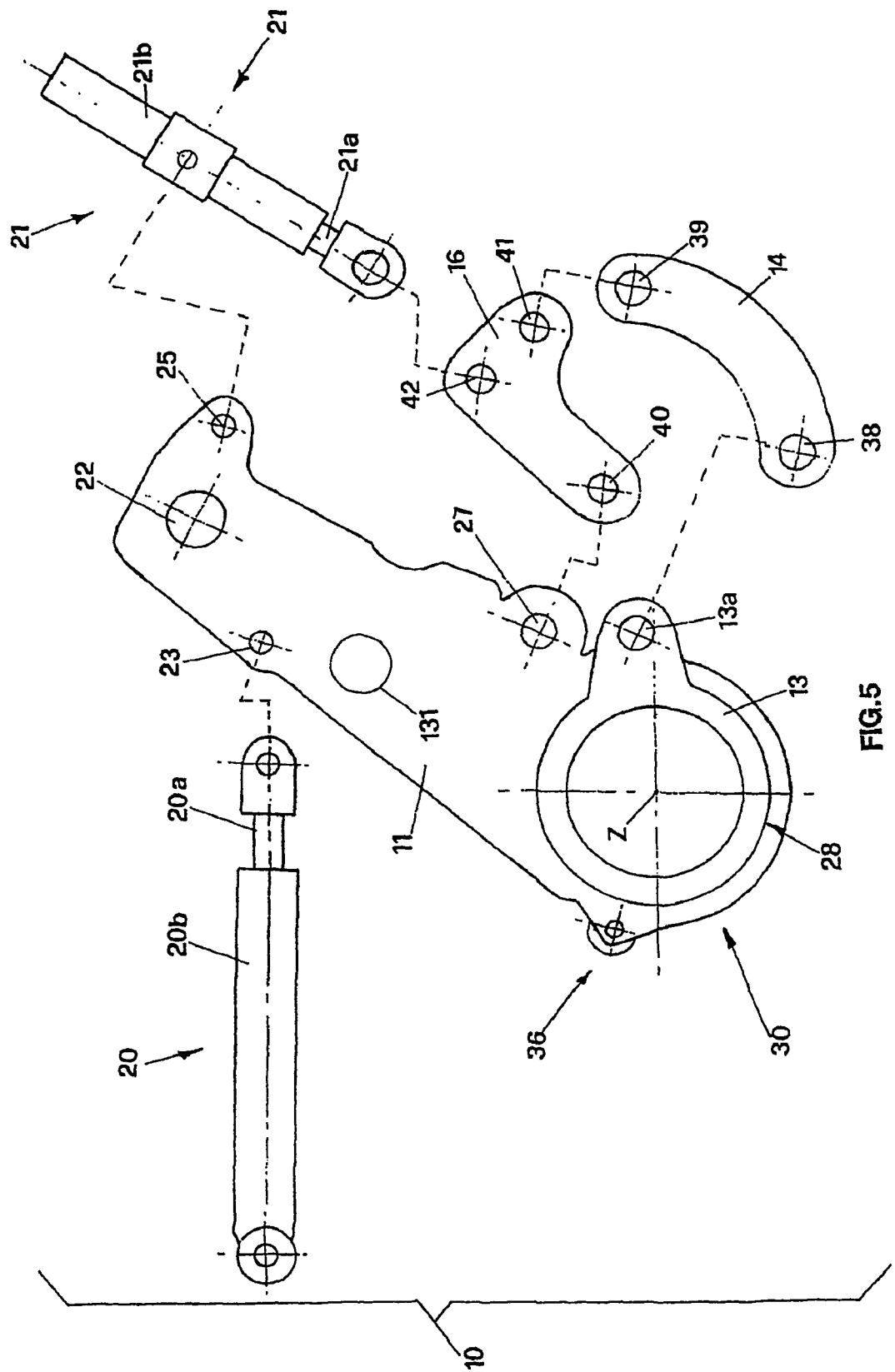
FIG. 5 is an exploded view illustrating parts of the articulation apparatus shown in the detail of FIG. 2.

In particular with reference to FIGS. 2 and 5, the second actuator 21 comprises an extendable actuation member in the form a body 21b slidably receiving an extendable rod 21a. The body 21b is pivotably supported on the support arm 11 by means of a third hole 25 in the support arm 11 receiving a pin 26 hinged or connected to the body 21b of the second actuator 21. The extendable actuation member of the second actuator 21 may be realised as a hydraulic jack.

The extendable rod 21a is linked to the coupling member 13 via a first and a second rigid link member 14 and 16 (also called first and second connecting rods). The coupling member or the ring 13 is pivotally connected to the first rigid link member 14 via a hole 13a (see FIG. 5) provided on the ring 13, a hole 38 provided in the first rigid link member 14 and a pin 15 coupling the holes 13a and 38. The first rigid link member 14 in turn is pivotably connected to the second rigid link member 16 via a hole 39 in the first rigid link member 14, a hole 41 in the second rigid link member 16 and a pin 18 extending therethrough. The second rigid link member 16 again is pivotably connected to the support arm 11 via a fourth hole 27 in the support arm 11, a hole 40 in the second rigid link member 16 and a pin 17 extending therethrough. In addition, the second rigid link member 16 is pivotably connected to the extendable rod 21a via a hole 42 in the second rigid link member 16 receiving a pivot pin 43 provided in the extendable rod 21a.

Figure 3:
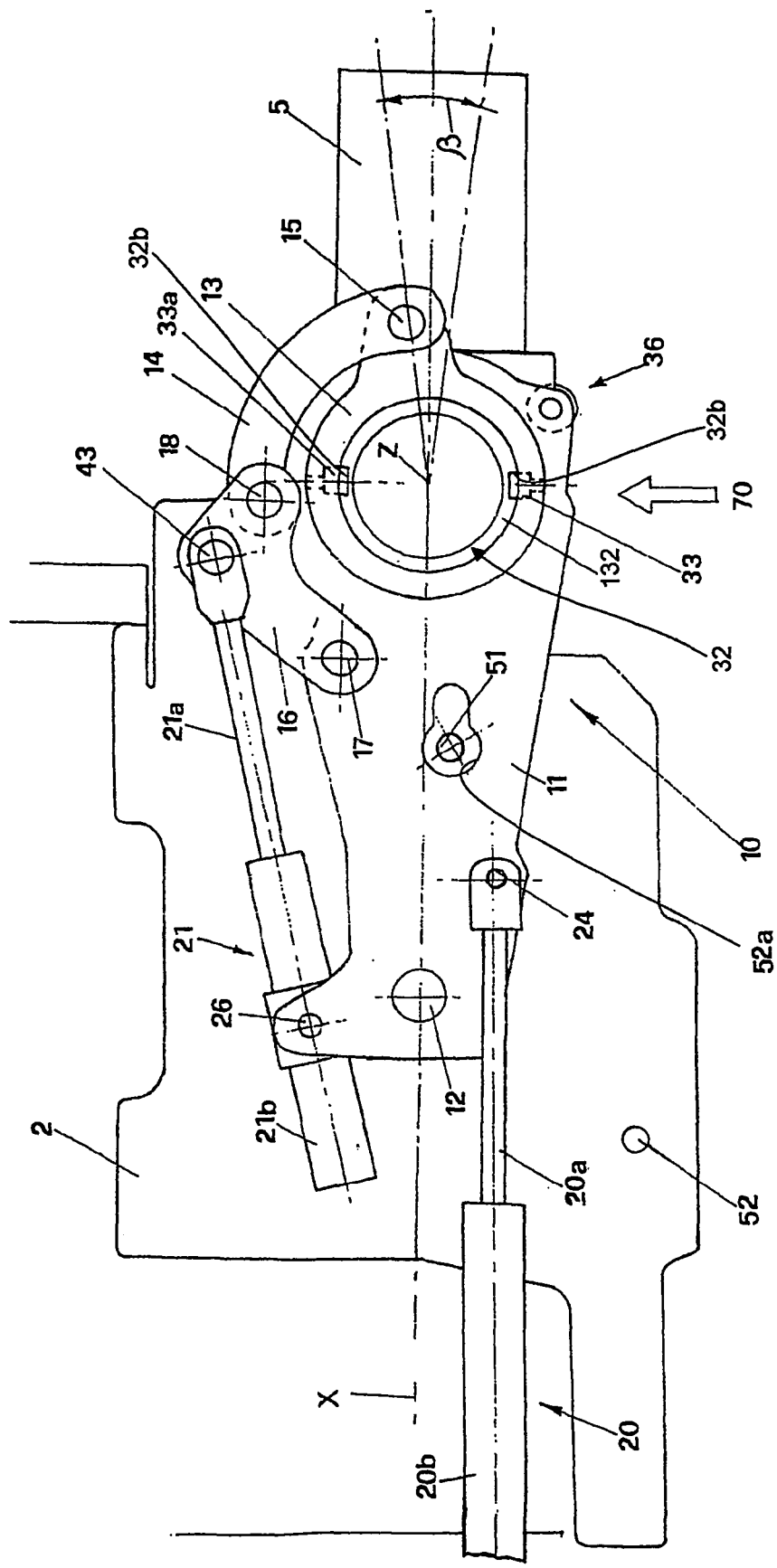
FIG. 3 is a schematic top plan view similar to FIG. 2 with the rear wheel arranged in a retracted position relative to the frame.

As can be seen in FIGS. 2 and 3, extending the extendable rod 21a of the second actuator causes rotation of the coupling ring 13 in a clockwise direction as viewed from above with the rigid link member 14 and 16 acting as torque arms. Retracting of the extendable rod 21a rotates the coupling ring 13 in a anticlockwise direction.

With reference to FIG. 4, the support arm 11 comprises a second seat 34 adjacent to the first seat 28 and receiving the body 35 of a movement detector 36 having a sensing element 37 in contact with the coupling ring 13 so as to detect any rotation of the coupling ring 13 relative to the support arm 11. The movement detector 26 can be any device known in the art for detecting the position of the ring 13 relative to the support arm 11.

The first actuator 20 is adapted to pivot the support arm 11 so as to position the wheel 5 either to project from the frame 2, as indicated by reference numeral 60 in FIG. 2, or to be retracted inside the frame 2, as indicated by reference numeral 70 in FIG. 3, and vice versa.

The support arm 11 is pivotably connected to the frame 2 by means of a first hole 22 receiving a pin 12 hinged or connected to the frame 2. In order to pivot the support arm 11 relative the frame 2, the first acutator 20 comprises an extendable actuation member in the form of a body 20b slidably receiving an extendable rod 20a. The body 20b of the first actuator 20 is pivotably supported on the frame 2 of the work machine 1. A second hole 23 provided in the support arm 11 receives a pin 24 hinged to the extendable rod 20a of the first actuator 20. As is readily seen in FIGS. 2 and 3, by extending the rod 20a, the support arm 11 is pivoted from the projecting position of the wheel 5 to its retracted postion relative to the frame. Preferably, the first actuator 20 is also realised as a hydraulic jack.

It is noted that the support arm 11 is the only support for connecting the rear wheel support including the sleeve 132 to the frame 2. The second actuator 21 does not take up any support load. The second actuator 21 is only used for rotating the sleeve 132 and consequently the rear wheel support about the vertical axis Z of the wheel 5.

Turning again to the support arm 11, FIG. 4 shows that this arm 11 is provided also with a seat 131 receiving an actuator 50 which is preferably a hydraulic jack. The actuator 50 is used for blocking a rotary movement of the support arm 11 with respect to the frame 2. The actuator 50 is mounted in the seat 131 provided in the support arm 11. A stem 51 of the actuator 50 can be inserted into holes 52, 52a provided in the frame 2 so as to block or lock the support arm 11 and prevent the articulation apparatus 10 from pivoting the support arm 11 relative to the frame 2. Blocking or locking the articulation apparatus 10 in this manner will also lock or block the wheel 5 supported by the inside column 132 in the retracted position 70 and in the projecting position 60 relative to the frame 2, respectively. However, the articulation apparatus 10, i.e. its second actuator 21, may still rotate the wheel 5 about the vertical axis Z.

The work machine 1 also includes an electric and electronic control device generally indicated by reference numeral 53 in FIG. 1. The control device 53 is installed adjacent the drivers seat 3 so as to be conveniently accessible by the operator O in order to control in particular the pivoting movement of the support arm 11, its locking or unlocking in the projecting and in the retracted position, and for rotating the wheel 5 about the vertical axis Z. These functions may be controlled either independently or coordinated, as will be described below.

Specifically, the control device 53 is connected to operative means (not shown in the drawings) for the actuating means 19. In case of the preferred embodiment, in which the first and second actuators 20 and 21 comprise hydraulic jacks, the operative means comprise distribution electro valves known per se having more ways and more positions so as to accurately control the actuation of the hydraulic jacks by pressurized oil. Also, the control device 53 is electrically connected to the motion detector 36 so as to detect the rotational direction β about the vertical axis Z of the wheel 5. The control device 53 may be a separate control unit or it may be part of a central control unit operable to control a plurality of functions of the work machine 1. It is clear that the man skilled in the art will conceive many known and practical configurations of the control device 53 so as to realize the desired control functions.

INDUSTRIAL APPLICABILITY

Operatively, the movement of the rear wheel 5 of the working machine 1 is now described by making reference to a start condition shown in FIG. 2, in which the rear wheel 5 is arranged at the position 60 projecting from the frame 2 and oriented with a vertical rotation track plane α arranged parallel to an axis X defining the machine movement direction.

The rotation of the support arm 11 is effected by the first actuator 20. To pivot the support arm 11 and hence the wheel 5, the extendable rod 20a of the first actuator 20 is extended, with the consequence that the support arm 11 can be rotated clockwise as shown by arrow V, until the configuration shown in FIG. 3 is reached with the wheel 5 being in its retracted position 70.

When the wheel 5 reaches the retracted position 70 as shown in FIG. 3, the stem 51 of the actuator 50 is inserted into the hole 52a provided in the frame 2 so as to block the wheel 5 in the retracted position 70.

If it is desired to move the wheel 5 from the retracted position 70 of FIG. 3 into the projecting position 60 of FIG. 2, it is sufficient to actuate the first actuator 20 in the opposite direction so as to retract the extendable rod 20a. Stability of the wheel 5 in the projecting position 60 is provided by the stem 51, which is then inserted into the hole 52 provided in the frame 2.

In view of the above it is clear that the articulation apparatus 10 of provides for enhanced operational reliability compared with prior art work machines. The only weight or load bearing element of the articulation apparatus 10 is the support arm 11. The support arm 11 requires only one pivot point 12 at the frame 2 so as to allow a play-free or rigid rotational movement of the wheel 5 between the projecting and retracted positions 60, 70, respectively. Thus, a more stable motion, less vibration and less wear are obtained with the work machine of the invention.

It should be understood that through the use of a rotating inside column or sleeve 132 together with a single support arm 11 of the articulation apparatus 10 that is also adapted to rotate the inside column 132 and the wheel 5 by a selected amount about the vertical axis Z as the wheel shifts from the retracted position 70 to the projecting position 60, or vice versa, a swinging motion for the wheel assembly may be obtained.

A selected orientation of the vertical plane α of the wheel 5 relative to the frame can be maintained by sensing the rotational position of the ring 13 and thus the lifting column 32 or its sleeve 132, and accordingly coordinate the rotational position β about the vertical axis Z with the extent of pivoting of the support arm 11 by the first actuator 20 so as to maintain the running direction of the wheel.

In particular, the control device 53 is adapted to detect relative rotation between the support arm 11 and the ring 13 by means of the movement detector 36, and may responsively actuate the second actuator 21 so as to rotate the wheel 5 about the vertical axis Z in order to keep the vertical plane α of the wheel 5 always parallel to the movement direction X of the work machine until the rear wheel 5 is placed in the final retracted or projecting position 70 and 60, respectively. Thus it is possible to move the wheel 5 between the projecting position 60 and the retracted postion 70 in such a way that it remains always oriented along the advancement direction of the work machine, i.e. with the vertical rotation plane α substantially parallel to the frame 2.

Alternatively, it is possible to modify the wheel orientation β about the vertical axis Z either when the wheel is moved and when it is at a standstill. Specifically, the wheel 5 may be positioned by means of the control device 53 in a selected rotational direction β about the vertical axis Z, i.e. clockwise or anticlockwise relative to the drawing plane of FIG. 2, by operating only the second actuator 21 and with the first actuator 20 for pivoting the support arm 11 inactive. i.e. the wheel 5 may be rotated about the vertical axis Z, be it in the projecting position as shown in FIG. 2, or be it retracted relative to the frame 2 as shown in FIG. 3. Further, the rotation of the wheel about the vertical axis Z is also independent of whether the work machine 1 is in motion or not, i.e. when it is at a standstill, by actuating the second actuator 21 via the control device 53. Especially when the work machine 1 is fitted with tracks this ensures maneuverability of the work machine 1 in every position of the track 5 between the fully projecting position 60 and the retracted position 70.

Thus, advantageously in the work machine 1 in accordance with the invention it is possible to move and steer each wheel or track 5 through a single respective articulation apparatus 10. Moreover, said moving and steering operations may be facilitated either independent or coordinated with each other. Particularly, steering may be carried out both when the wheel or track 4, 5 is in the retracted position and when it is arranged in a position projecting from the frame 2 which is of particular advantage in case the machine is fitted with tracks instead of wheels. The movement of the wheel or track 5 from the projecting position 60 to the retracted position 70 relative to the frame 2 as well as its steering can be obtained by a single articulation apparatus 10 provided with a first actuator 20 for the movement of the wheel or track 5 and a second actuator 21 for the steering operation. Advantageously the operator O—without having to leave the operator seat 3—can easily control said actuators 20, 21 either coordinated or independent through the electric and electronic control device 53 which is conveniently accessible.

Although the invention was described with reference to a specific preferred embodiment, it is clear in the light of the overall disclosure that the man skilled in the art may easily conceive modifications and variations not particularly addressed in the above description. For example, it is clear that any appropriate connection arrangements for the movable parts of the articulation apparatus 10 in accordance with the invention may be used and they are not restricted to the above described "pin-and-hole" constructions. Also, the ring 13 could be replaced by a half ring or any other suitable coupling member.

Other aspects, objects and advantages of this invention can be obtained from a study of the drawings, disclosures, and the appended claims.

PART LIST:

1 work machine
2 frame
3 operator seat
4 front wheels
5 rear wheels
6 work tool
7 work space
8 rotary shaft
9 position of drive mechanism
10 articulation apparatus
11 support arm
12 pin
13 coupling member or ring
13a hole
14 first rigid link member
15 pin
16 second rigid link member
17 pin
18 pin
19 actuating means
20 first actuator
20a extendable rod
20b body
21 second actuator
21a extendable rod
21b body
22 first hole
23 second hole
24 pin
25 third hole
26 pin
27 hole
28 first seat
29 through hole
30 fork shaped portion or end
31 lifting column actuator
32 lifting column
32a U-shaped bracket
32b groove(s)
33 key
33a key
34 second seat
35 body of movement detector
36 movement detector
37 sensing element
38 hole
39 hole
40 hole
41 hole
42 hole 43 pivot pin
50 actuator
51 stem
52 hole
52a hole
53 control device
60 projecting position
70 retracted position
105 bearing
113 through hole
131 seat
132 sleeve or inside column
133 support column or outside column
134 body of hydraulic jack
134b stem of hydraulic jack
α vertical rotation track plane
β rotational direction
π plane
O operator
V arrow
X machine movement direction
Z vertical axis

The invention claimed is:

1. A work machine comprising:
a frame supported by a pair of front wheels or tracks and a pair of rear wheels or tracks, at least one of the wheels or tracks being associated with a respective lifting column adapted to raise and lower said frame relative to the respective wheel or track;
a work tool supported by said frame;
a drive mechanism adapted to rotate said work tool and at least one of said wheels or tracks;
an articulation apparatus adapted to pivotally move said one of said wheels or tracks associated with said lifting column between a projecting position and a retracted position relative to said frame, said articulation apparatus including:
a support arm pivotally connecting said frame to the lifting column associated with said one wheel or track;
a first actuator connected to said support arm and operable to pivot said support arm relative to said frame;
a second actuator adapted to rotate said at least one wheel or track about a vertical axis.

2. The machine of claim 1, wherein said second actuator is connected between said support arm and said lifting column and is adapted to controllably cause relative rotation between said lifting column and said support arm.

3. The machine of claim 2, wherein said second actuator is connected to a coupling member which is in rotary engagement with said lifting column.

4. The machine of claim 3, wherein said support arm includes a fork-shaped end providing with respect to the vertical axis of the lifting column an axially and radially extending space adapted to receive said coupling member.

5. The machine of claim 3, wherein said coupling member comprises a ring arranged coaxial with and coupled to said lifting column via at least one longitudinally extending groove.

6. The machine of claim 5, wherein said ring is coupled to said at least one groove by at least one key adapted to be in engagement with said groove, said groove being in a sleeve of said lifting column and having fixedly attached at its lower end a generally U-shaped bracket adapted to receive said at least one wheel or track.

7. The machine of claim 3, wherein said first actuator comprises an extendable actuation member being on one end pivotably connected to said support arm and at the other end pivotably connected to said frame.

8. The machine of claim 3, further including a control device adapted to independently control said first and second actuators.

9. The machine of claim 8, wherein said control device is adapted to coordinate said first and second actuators as to maintain the orientation of a vertical rotation plane of said one wheel or track relative to said frame during pivoting movement of said support arm.

10. The machine of claim 9, wherein said control device includes at least one movement detector associated with said articulation apparatus.

11. The machine of claim 10, wherein said movement detector is adapted to detect relative movement between said coupling member and said support arm.

12. The machine of claim 11, wherein said support arm comprises a seat formed adjacent said coupling member and receiving said movement detector, and wherein said detector received in said seat has a sensor element in contact with said coupling member.

13. The machine of claim 8, wherein said control device is adapted to coordinate said first and second actuators so as to maintain a running direction of said one wheel or track during pivoting movement of said support arm.

14. The machine of claim 1, wherein said second actuator includes a first rigid link member pivotably connected to said coupling member and a second rigid link member pivotably connected to said support arm, both said first and second link members being also pivotably connected to each other, said second actuator further including an extendable actuation member pivotably connected on one end to said support arm and on the other end to said second rigid link member.

15. The machine of claim 1, wherein said support arm includes an actuator adapted to lock said support arm in its projecting position and retracted position, respectively.

16. The machine of claim 15, wherein said actuator includes a stem adapted to come into engagement with a first hole in said frame when said support arm is in its projecting position and with a second hole in said frame when the support arm is in its retracted position.

17. A method of controlling the position of at least one wheel or track of a plurality of wheels or tracks supporting a frame of a work machine, said at least one wheel or track being connected to a respective lifting column connected to said frame by a support arm, said lifting column being adapted to raise and lower said frame relative to the respective wheel or track, said method comprising the steps of:
controllably actuating a first actuator to pivot said support arm relative to said frame to position said wheel or track between a projecting or retracted position relative to said frame, the projecting and retracted position forming an arc of at least 90°, and
controllably actuating a second actuator to position said wheel or track in a selected rotational direction about a vertical axis of said wheel or track.

18. The method of claim 17, wherein pivoting of said support arm includes extending or retracting an extendable actuation member of said first actuator being on one end pivotably connected to said support arm and at the other end pivotably connected to said frame.

19. The method of claim 17, wherein positioning said wheel or track in said rotational direction includes rotating said lifting column.

20. The method of claim 19, wherein positioning said wheel or track in said selected rotational direction includes rotating a sleeve of said lifting column having fixedly attached at its lower end a generally U-shaped bracket adapted to receive said at least one wheel or track.

21. The method of claim 20, wherein positioning said wheel or track in said rotational direction includes extending or retracting an extendable actuation member of said second actuator pivotably connected on one end to said support arm and on the other end connected to a coupling member which is in rotary engagement with said lifting column.

22. The method of claim 19, wherein positioning of said wheel or track in said rotational direction is determined by detecting a rotational position of said lifting column about said vertical axis of said wheel or track relative to said support arm.

23. The method of claim 22, wherein said detecting the rotational position of said lifting column includes detecting a position of a coupling member relative to said support arm, said coupling member being in rotary engagement with said lifting column.

24. The method of claim 17, wherein positioning said wheel or track in said rotational direction is controlled dependent on pivoting of said wheel or track relative to said frame.

25. The method of claim 24, wherein said controlling further includes coordinating positioning of said wheel or track in said selected rotational direction and pivoting of said wheel or track relative to said frame so as to maintain a predetermined orientation of said one wheel or track relative to said frame during pivoting of said one wheel or track relative to said frame.

26. The method of claim 17, further including locking of said support arm in its projecting position and retracted position, respectively, by means of an actuator.

27. The method of claim 26, wherein said locking includes engaging an actuatable stem provided on said support arm with a first hole in said frame when said support arm is in its projecting position and with a second hole in said frame when the support arm is in its retracted position.

28. The method of claim 17, wherein positioning said wheel or track in said rotational direction about the vertical axis is coordinated with the steering of at least one of the other of the plurality of wheels or tracks.

29. A work machine, comprising:
a frame supported by a plurality of wheels or tracks, at least one of which is associated with a rotatable sleeve of a respective lifting column adapted to raise and lower said frame relative to the respective wheel or track;
a work tool supported by said frame;
a drive mechanism adapted to rotate said work tool and at least one of said wheels or tracks;
a fixed-length articulation apparatus adapted to pivotally move said one of said wheels or tracks associated with said lifting column between a projecting position and a retracted position relative to said frame;
a first actuator connected between said articulation apparatus and said frame and adapted to pivot said one of said wheels or tracks relative to said frame; and
a second actuator connected between said articulation apparatus and said rotatable sleeve of said respective lifting column and adapted to rotate said at least one wheel or track about a vertical axis.

30. The machine of claim 29, including a control device adapted to independently control said first and second actuators.

31. The machine of claim 30, wherein said control device is adapted to coordinate said first and second actuators so as to maintain the orientation of a vertical rotation plane of said one wheel or track relative to said frame during pivoting movement of said one wheel or track.

32. The machine of claim 30, wherein said control device is adapted to coordinate said first and second actuators so as to maintain a running direction of said one wheel or track during pivoting movement of said support arm.

33. The machine of claim 29, wherein said articulation apparatus includes an actuator adapted to lock said one wheel or track in the projecting and retracted positions, respectively.

34. A work machine comprising:
a frame supported by a plurality of wheels or tracks, at least one of which is associated with a respective lifting column adapted to raise and lower the frame relative to the respective wheel or track;
a work tool supported by the frame;
a drive mechanism adapted to rotate the work tool and at least one of the wheels or tracks;
an articulation apparatus adapted to pivotally move the one of the wheels or tracks associated with the lifting column between a projecting position and a retracted position relative to the frame, the articulation apparatus including:
a support arm pivotally connecting the frame to the lifting column associated with the one wheel or track;
a first actuator connected to the support arm and operable to pivot the support arm relative to the frame;
a second actuator adapted to rotate the at least one wheel or track about a vertical axis, the second actuator including a first rigid link member pivotably connected to the coupling member and a second rigid link member pivotably connected to the support arm, both the first and second link members being also pivotably connected to each other, the second actuator further including an extendable actuation member pivotably connected on one end to the support arm and on the other end to the second rigid link member.

35. A work machine comprising:
a frame supported by a plurality of wheels or tracks, at least one of which is associated with a respective lifting column adapted to raise and lower the frame relative to the respective wheel or track;
a work tool supported by the frame;
a drive mechanism adapted to rotate the work tool and at least one of the wheels or tracks;
an articulation apparatus adapted to pivotally move the one of the wheels or tracks associated with the lifting column between a projecting position and a retracted position relative to the frame, the articulation apparatus including:
a support arm pivotally connecting the frame to the lifting column associated with the one wheel or track;
a first actuator connected to the support arm and operable to pivot the support arm relative to the frame;
a second actuator adapted to rotate the at least one wheel or track about a vertical axis, the second actuator connected between the support arm and the lifting column and adapted to controllably cause relative rotation between the lifting column and the support arm, the second actuator further connected to a coupling member which is in rotary engagement with the lifting column;
a control device adapted to independently control the first and second actuators, the control device further adapted to coordinate the first and second actuators so as to maintain the orientation of a vertical rotation plane of the one wheel or track relative to the frame during pivoting movement of the support arm, the control device including at least one movement detector associated with the articulation apparatus, the movement detector adapted to detect relative movement between the coupling member and the support arm, the support arm comprising a seat formed adjacent the coupling member and receiving the movement detector, and wherein the detector received in the seat has a sensor element in contact with the coupling member.

36. A work machine comprising:

a frame supported by a plurality of wheels or tracks, at least one of which is associated with a respective lifting column adapted to raise and lower the frame relative to the respective wheel or track;

a work tool supported by the frame;

a drive mechanism adapted to rotate the work tool and at least one of the wheels or tracks;

an articulation apparatus adapted to pivotally move the one of the wheels or tracks associated with the lifting column between a projecting position and a retracted position relative to the frame, the articulation apparatus including:

a support arm pivotally connecting the frame to the lifting column associated with the one wheel or track;

a first actuator connected to the support arm and operable to pivot the support arm relative to the frame, the support arm including an actuator adapted to lock the support arm in its projecting position and retracted position, respectively, the actuator including a stem adapted to come into engagement with a first hole in the frame when the support arm is in its projecting position and with a second hole in the frame when the support arm is in its retracted position;

a second actuator adapted to rotate the at least one wheel or track about a vertical axis.

37. A method of controlling the position of at least one wheel or track of a plurality of wheels or tracks supporting a frame of a work machine, the at least one wheel or track being connected to a respective lifting column connected to the frame by a support arm, the lifting column being adapted to raise and lower the frame relative to the respective wheel or track, the method comprising the steps of:

controllably actuating a first actuator to pivot the support arm relative to the frame to position the wheel or track between a projecting or retracted position relative to the frame;

controllably actuating a second actuator to position the wheel or track in a selected rotational direction about a vertical axis of the wheel or track;

positioning the wheel or track in the rotational direction including rotating the lifting column; and positioning of the wheel or track in the rotational direction being determined by detecting a rotational position of the lifting column about the vertical axis of the wheel or track relative to the support arm.

38. A method of controlling the position of at least one wheel or track of a plurality of wheels or tracks supporting a frame of a work machine, the at least one wheel or track being connected to a respective lifting column connected to the frame by a support arm, the lifting column being adapted to raise and lower the frame relative to the respective wheel or track, the method comprising the steps of:

controllably actuating a first actuator to pivot the support arm relative to the frame to position the wheel or track between a projecting or retracted position relative to the frame;

controllably actuating a second actuator to position the wheel or track in a selected rotational direction about a vertical axis of the wheel or track; and locking the support arm in its projecting position and retracted position, respectively, by means of an actuator, the locking including engaging an actuatable stem provided on the support arm with a first hole in the frame when the support arm is in its projecting position and with a second hole in the frame when the support arm is in its retracted position.

\* \* \* \* \*